July 4, 1967 W. STEUERNAGEL 3,328,940
ELECTROSTATIC GAS FILTER ELECTRODE
Filed Nov. 30, 1964 2 Sheets-Sheet 1
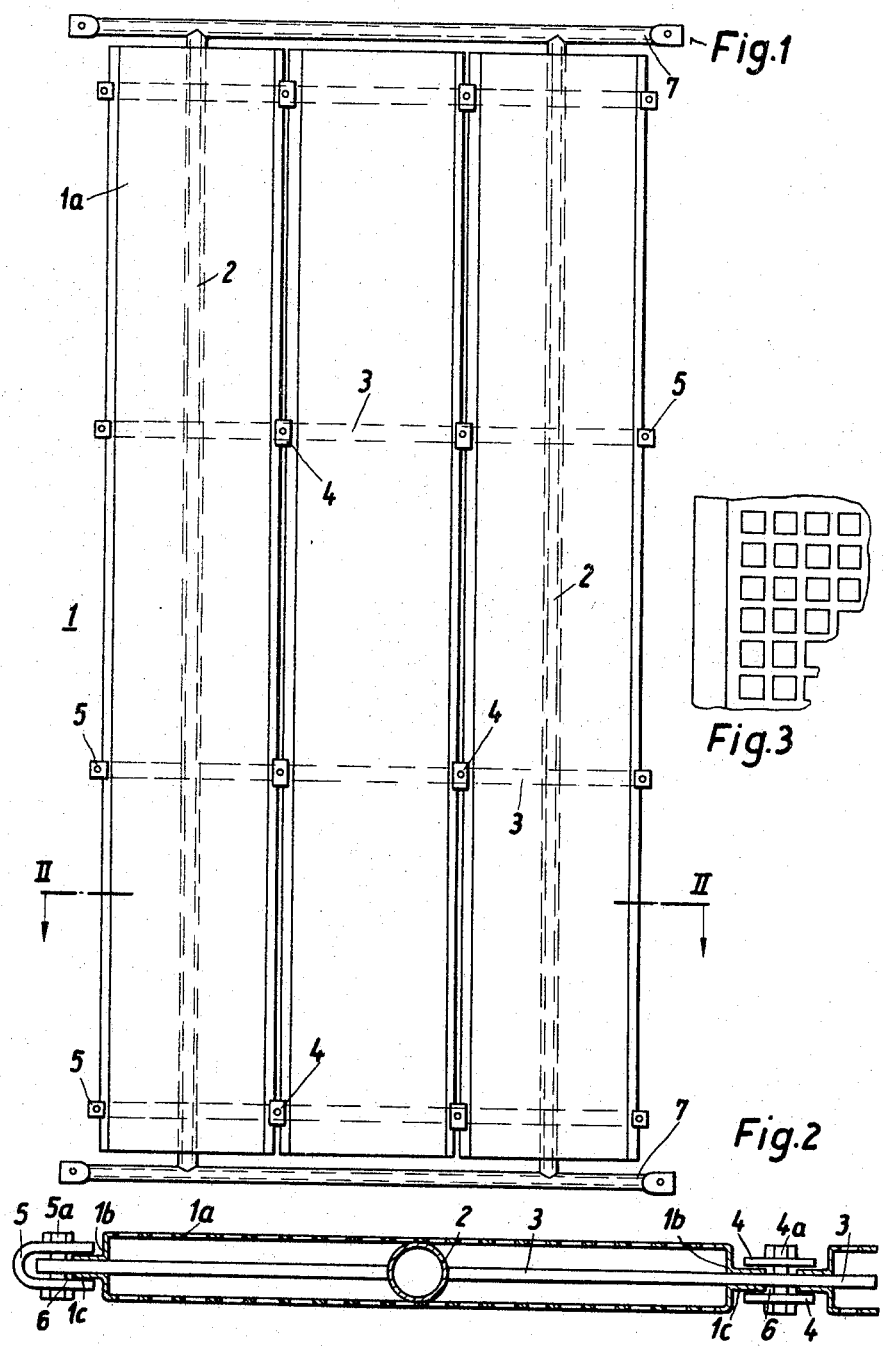
Inventor:
Walter Steuernagel
By Bailey, Stephens & Huettig
Attorneys United States Patent Office 3,328,940
Patented July 4, 1967

3,328,940
ELECTROSTATIC GAS FILTER ELECTRODE
Walter Steuernagel, Frankfurt am Main, Germany, assignor to Metallgesellschaft Aktiengesellschaft, Frankfurt am Main, Germany
Filed Nov. 30, 1964, Ser. No. 414,665
Claims priority, application Germany, Dec. 18, 1963, M 46,877
4 Claims. (Cl. 55—131)

This invention relates to an electrode for an electrostatic gas filter.

For the cleaning of converter waste gases, electrostatic filters with a non-sparking condenser field have been proven satisfactory for precipitating dust. Such filters use screen-like metallic electrodes spaced apart from about 30 to 50 mm. in order to achieve a high degree of efficiency in separating the impurities from the gas. Ordinarily steel wire screens are used which are spaced apart by separators. However, in practice, it has been found that the various operating conditions arising during the cleaning of hot gases such as by interruptions in the blowing of a converter result in temperature changes and cause warping of the screens. This warping of the screens alters the distance between the screens which varies the electrical field and impairs considerably the efficiency affecting the separation of the dust from the gas. Even the use of rigid frames for the screens does not eliminate such warping. Again, if additional separators are placed between the screens, then the flow path for the gases is obstructed and the degree of dust separation reduced.

The object of this invention is to avoid the heretofore existent disadvantages while retaining the usefulness of the condenser field in the filter. According to this invention, the electrode in a sparkless condenser filter is in the form of a rectangular box. The electrode is composed of a pair of foraminated members such as metal or wire screens reinforced by a skeleton-like and load-bearing framework positioned between and connected to the members. This framework reinforces and supports the foraminated members.

The supporting and load-bearing framework of this invention is composed of tubes connected to transverse beams such as flat or angled irons or tubes. Adjacent electrodes are joined by the means of attachment plates and the free edges of the members are fastened together by clamps.

The attachment plates are fastened together by bolts and the clamps are secured by bolts. A space is left between the bolts and the flanged edges of the foraminated members in order to leave room for the thermal expansion of the members. Consequently, the bolts are tightened to hold the members together but are loose enough to allow for expansion of the members.

Experience has shown that this invention using the framework support and expansion spaces has the advantage that no serious warping of the electrodes occurs during sudden temperature changes. At the most, the surface of the electrode is distorted less than 2 mm.

The means by which the objects of the invention are obtained are described more fully with reference to the accompanying drawings in which:

FIGURE 1 is a front elevational view of the electrode of this invention;

FIGURE 2 is a cross-sectional view taken on the line 2—2 of FIGURE 1;

FIGURE 3 is a partial view of an enlarged detail of the foraminated member; and

Figure 4:
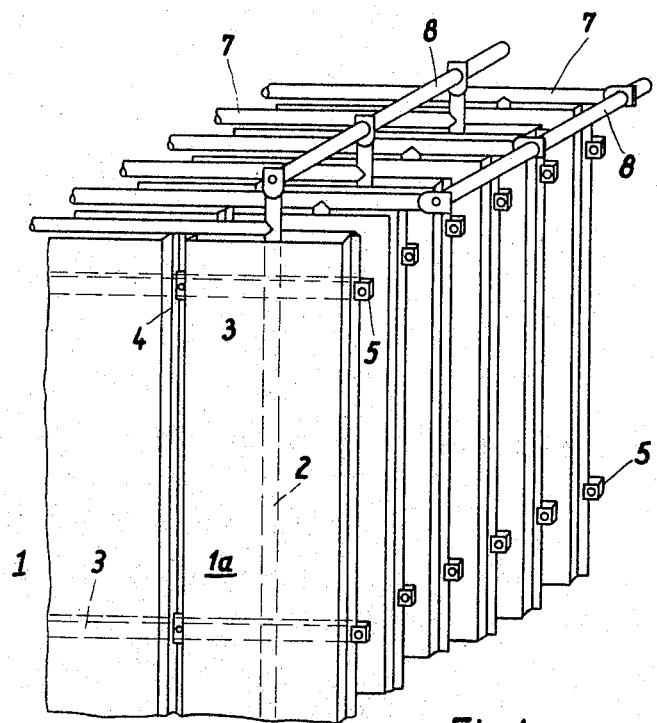
FIGURE 4 is a perspective view of an assembly of electrodes.

As shown in the drawings, the electrode 1 is composed of a plurality of foraminated members, such as metal or wire screens 1a. The longitudinal side edges of each screen are bent at a right angle to form side walls 1b and then rebent to form edge flanges 1c. The load-bearing or supporting framework is composed of one or more longitudinally extending tubes 2 to which are attached transversely extending beams 3. These beams can be in the form of flat metal strips, angle irons or tubes.

The electrode is assembled by positioning the supporting framework between a pair of foraminated members 1a with the flanges 1c in contact with the beams 3. The flanges of adjacent electrodes are fastened to beams 3 by being clamped between attachment plates 4 by means of a bolt 4a. The free side edges of the electrode members 1a are likewise clamped against the beam 3 by means of attachment plates in the form of C-shaped clamps 5 and bolts 5a. The edges of flanges 1c are separated from the bolts 4a and 5a, respectively, by a space 6 which serves as an expansion chamber for the thermal expansion of the members 1a and flanges 1c. In order to permit this expansion, the bolts 4a and 5a are tightened enough to hold the flange 1c firmly against the beams 3 but loose enough to permit the thermal movement of the flanges. As shown in FIGURE 1, the attachment plates 4 and 5 are positioned at spaced points on the longitudinal edges of flanges 1c where the crossbeams 3 exist.

As shown in FIGURE 4, the supporting framework extends outwardly beyond at least one end of the electrode and is connected to a transverse tube 7 for purposes of support and/or the electrical bus bar for high voltage. Rods 8 extending between the supporting frameworks for adjacent electrodes are attached to the frameworks for the purpose of keeping the electrodes spaced from each other as accurately as possible.

Having now described the means by which the objects of the invention are obtained, I claim:

1. An electrode for a sparkless condenser field electrostatic gas filter comprising a pair of spaced metal foraminated members lying in substantially parallel vertical planes, inwardly turned vertically extending side walls on each member at each vertically extending end thereof, vertically extending edge flanges bent outwardly of said vertically extending side walls and extending parallel to said members, a metal framework positioned between said members, and attachment plate means fastening each of said flanges to said framework at vertically spaced apart points on said members, said members forming a substantially rectangular box, and adjusting means adjusting said attachment plate means to a position permitting said flanges to slide on said framework during thermal expansion of said members without warping of the electrode while maintaining frictional engagement between said framework and said flanges thereby maintaining said members in a position forming said substantially rectangular box.

2. An electrode as in claim 1, said framework comprising at least one tube and transversely extending beams joined to said tube said beams extending to said spaced apart points.

3. An electrode as in claim 2, said adjusting means including bolts mounted in said attachment plate means for clamping said flanges, to said framework and a flange expansion space between said bolts and said flanges.

4. An electrode as in claim 3, said bolts being tightened enough to hold said flanges in frictional engagement with said beams but loose enough to permit thermal expansion movement of said flanges.

References Cited

UNITED STATES PATENTS

| | | | |
|---|---|---|---|
| 1,767,338 | 6/1930 | Arras | 55—130 |
| 1,943,070 | 1/1934 | Grave | 55—154 X |
| 2,529,594 | 11/1950 | Chamberlin | 55—156 X |
| 2,575,181 | 11/1951 | Mack | 55—156 X |
| 2,668,600 | 2/1954 | Wintermute | 55—108 X |
| 2,815,824 | 12/1957 | Armstrong et al. | 55—130 |
| 2,866,517 | 12/1958 | Phyl | 55—148 |
| 2,996,144 | 8/1961 | Phyl | 55—156 X |

FOREIGN PATENTS

| | | |
|---|---|---|
| 1,066,141 | 1/1954 | France. |
| 500,221 | 2/1939 | Great Britain. |

HARRY B. THORNTON, *Primary Examiner.*

D. E. TALBERT, *Assistant Examiner.*